United States Patent [19]

Saotome et al.

[11] Patent Number: 4,843,241
[45] Date of Patent: Jun. 27, 1989

[54] RADIATION IMAGE RECORDING AND READ-OUT APPARATUS

[75] Inventors: Shigeru Saotome; Masamitsu Ishida, both of Kanagawa, Japan

[73] Assignee: Fuji Photo Film Co., Ltd., Kanagawa, Japan

[21] Appl. No.: 158,040

[22] Filed: Feb. 16, 1988

Related U.S. Application Data

[63] Continuation of Ser. No. 789,261, Oct. 18, 1985, abandoned.

[30] Foreign Application Priority Data

Oct. 20, 1984 [JP] Japan .................. 59-220742

[51] Int. Cl.⁴ .................................. G01N 23/04
[52] U.S. Cl. ......................................... 250/327.2
[58] Field of Search ....................... 250/484.1, 327.2

[56] References Cited

U.S. PATENT DOCUMENTS

| | | |
|---|---|---|
| 3,775,613 | 11/1973 | Hommerin . |
| 3,967,130 | 6/1976 | Decker . |
| 4,199,687 | 4/1980 | Brendl et al. . |
| 4,365,342 | 12/1982 | Vepy ......................... 378/173 |
| 4,485,304 | 11/1984 | Teraoka et al. ............. 250/484.1 |
| 4,543,479 | 9/1985 | Kato .......................... 250/327.2 |
| 4,578,582 | 3/1986 | Takano ....................... 250/327.2 |
| 4,659,929 | 4/1987 | Fujiwara et al. ............ 378/172 |
| 4,701,617 | 10/1987 | Utsumi ........................ 250/484.1 B |

FOREIGN PATENT DOCUMENTS 0077678 10/1982 European Pat. Off. .

Primary Examiner—Carolyn E. Fields
Attorney, Agent, or Firm—Sughrue, Mion, Zinn, Macpeak & Seas

[57] ABSTRACT

A radiation image recording and read-out apparatus comprises a section for recording a radiation image on a stimulable phosphor sheet, a section for reading out the radiation image, a section for erasing radiation energy remaining on the stimulable phosphor sheet after image read-out, and conveyors for circulating the stimulable phosphor sheet through these sections. The image recording section is provided with a sheet holding system for recording the radiation image by exposing the stimulable phosphor sheet to a radiation passing through an object, and a fluoroscopic unit for receiving the radiation passing through the sheet holding system when the stimulable phosphor sheet is not held by the sheet holding system and for converting the radiation into a signal for reproducing a monitor image. By observing the monitor image, timing of the image recording is adjusted.

5 Claims, 2 Drawing Sheets

RADIATION IMAGE RECORDING AND READ-OUT APPARATUS

This is a continuation of application Ser. No. 789,261 filed Oct. 18, 1985, now abandoned.

BACKGROUND OF THE INVENTION

1. Field of the Invention

This invention relates to a radiation image recording and read-out apparatus comprising an image recording section, an image read-out section and an erasing section formed integrally with each other so that stimulable phosphor sheets are circulated and reused for recording a radiation image of an object.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428, and Japanese Unexamined Patent Publication No. 56(1981)-11395, it has been proposed to use a stimulable phosphor in a radiation image recording and reproducing system. Specifically, a sheet comprising the stimulable phosphor is first exposed to a radiation passing through an object to have a radiation image stored therein, and is then scanned with stimulating rays which cause it to emit light in proportion to the radiation energy stored. The light emitted by the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom in a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load a mobile X-ray diagnostic station with a large number of stimulable phosphor sheets, and the number of the stimulable phosphor sheets which can be loaded on the mobile X-ray diagnostic station is limited. Therefore, it is desired to load the mobile X-ray diagnostic station with stimulable phosphor sheets which can be used repeatedly, once store the radiation images of the objects in the stimulable phosphor sheets, transfer the electric image signals read out from the stimulable phosphor sheets into a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as described above, the radiation energy remaining in the stimulable phosphor sheet after it is scanned with stimulating rays to read out the radiation image stored therein should be eliminated or erased by the method as described, for example, in Japanese Unexamined Patent Publication No. 56(1981)-12599 or U.S. Pat. No. 4,400,619. The stimulable phosphor sheet can then be used again for radiation image recording.

Accordingly, it is desired that there be combined into a single apparatus: an image recording section for exposing each circulatable and reusable sheet comprising a stimulable phosphor to a radiation passing through an object, an image read-out section for reading out the radiation image stored in the stimulable phosphor sheet, and an erasing section for erasing the radiation energy remaining on the stimulable phosphor sheet after the read-out step for the purpose of again recording radiation image thereon. This is because such an arrangement would make it possible to easily load the apparatus on the mobile X-ray diagnostic station to conduct medical examinations at different locations. Such an apparatus could also be easily installed in a hospital or the like. This is very advantageous in practical use.

From the aforesaid viewpoint, the applicant proposed in Japanese Patent Application No. 58(1983)-66730 a built-in type radiation image recording and read-out apparatus comprising an image recording section, an image read-out section and an erasing section combined into a single unit so that stimulable phosphor sheets are circulated are reused for image recording. In the radiation image recording and readout apparatus, it is possible to circulate the stimulable phosphor sheets and to conduct radiation image recording and read-out continuously. However, since the timing of radiation image recording must be adjusted based on the experience and intuition of the operator, it is not always possible to obtain a desired image.

SUMMARY OF THE INVENTION

The primary object of the present invention is to provide a built-in type radiation image recording and read-out apparatus wherein the timing of radiation image recording is adjusted reliably.

Another object of the present invention is to provide a built-in type radiation image recording and read-out apparatus wherein a desired image can be obtained accurately and quickly.

The present invention provides a radiation image recording and read-out apparatus comprising:
  (i) a circulation and conveyance means for conveying at least one stimulable phosphor sheet for recording a radiation image thereon along a predetermined circulation path,
  (ii) an image recording section provided with a sheet holding means positioned on said circulation path for recording a radiation image of an object on said stimulable phosphor sheet by exposing said stimulable phosphor sheet to a radiation passing through said object, and a fluoroscopic means for receiving said radiation passing through said sheet holding means when said stimulable phosphor sheet is not held by said sheet holding means and for converting said radiation into a signal for producing a visible image, (iii) an image read-out section positioned on said circulation path and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned with said stimulating rays to obtain an electric image signal, and (iv) an erasing section positioned on said circulation path for, prior to the next image recording on said stimulable phosphor sheet for which the image read-out has been conducted at said image read-out section, releasing the radiation energy remaining on said stimulable phosphor sheet.

In the radiation image recording and read-out apparatus of the present invention, the image recording section provided with the fluoroscopic means, the image read-out section and the erasing section are formed integrally with each other, and the image recording section is communicated with the image read-out section and the erasing section via a closable sheet conveyance port so that the stimulable phosphor sheet is conveyed and circulated by the circulation and conveyance means inside of the apparatus. Therefore, it is not necessary to manually convey the stimulable phosphor sheet between an image recording apparatus and an image read-out and erasing apparatus as in the conventional radiation image recording and read-out apparatus. Thus since the stimulable phosphor sheet is conveyed automatically, the operability of the apparatus is improved. Also, since the image read-out from the stimulable phosphor sheet is conducted immediately after the image recording, it is possible to obtain an image accurately and quickly. Further, since the image recording section, the image read-out section and the erasing section are formed integrally with each other, the apparatus becomes compact as a whole. It is also possible to adjust the timing of radiation image recording reliably and easily without relying on the experience and intuition of the operator.

DESCRIPTION OF THE PREFERRED EMBODIMENTS

The present invention will hereinbelow be described in further detail with reference to the accompanying drawings.

Figure 1:
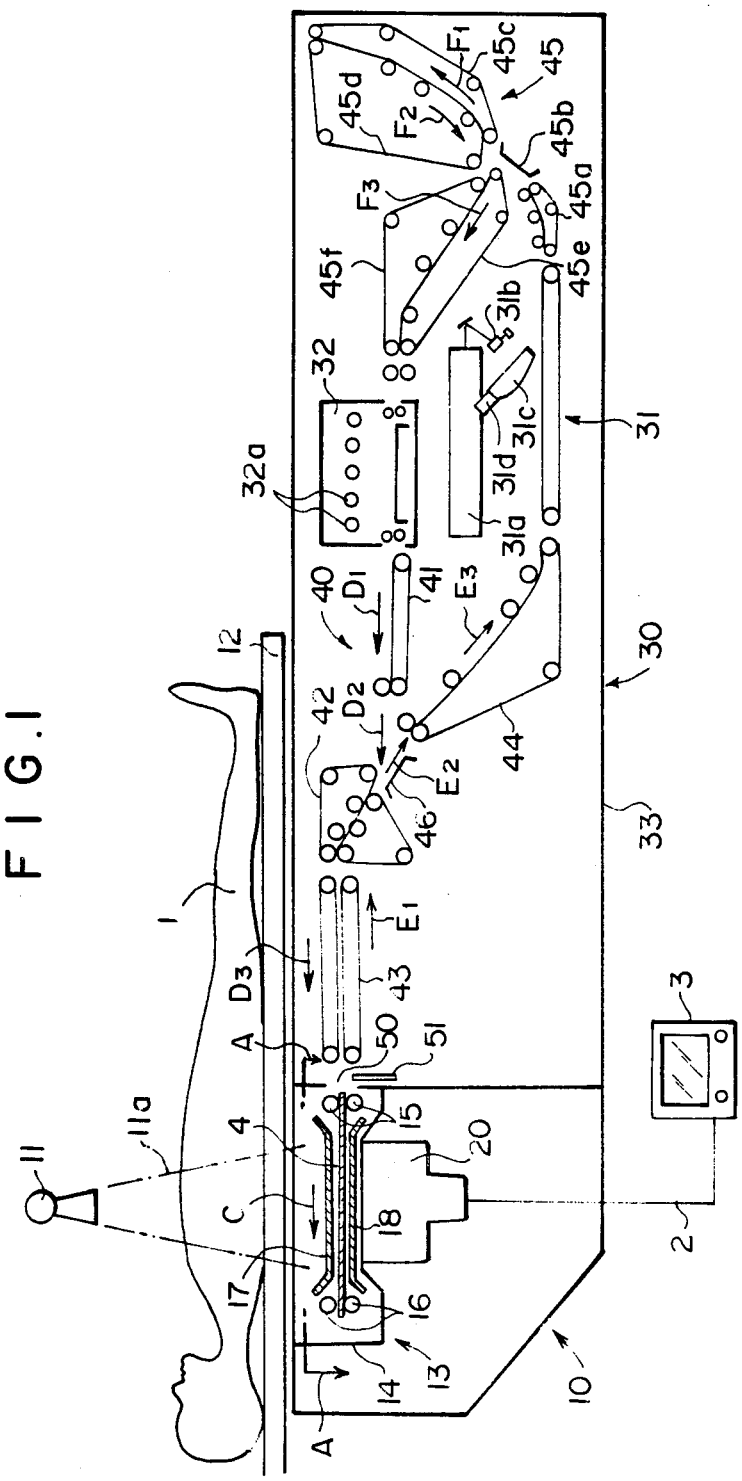
FIG. 1 is a schematic sectional view showing an embodiment of the radiation image recording and read-out apparatus in accordance with the present invention.

Referring to FIG. 1, the radiation image recording and read-out apparatus comprises an image recording section 10 for recording a radiation image on a stimulable phosphor sheet, an image read-out section 31 for detecting the recorded radiation image, an erasing section 32 for releasing the radiation energy remaining on the stimulable phosphor sheet after the image read-out, and a circulation and conveyance means 40 for conveying and circulating the stimulable phosphor sheet through the image recording section 10, the image read-out section 31 and the erasing section 32.

The image recording section 10 is constituted by a radiation source 11 for emitting a radiation 11a onto an object 1, an object supporting base 12 for supporting the object 1, a sheet holding means 13 positioned on the side opposite to the radiation source 11 with respect to the object supporting base 12, and a fluoroscopic means 20 positioned near the sheet holding means 13 on the side opposite to the radiation source 11 with respect to the sheet holding means 13. The sheet holding means 13 holds a stimulable phosphor sheet 4 at the image recording position for recording a radiation image of the object 1 on the sheet 4. The sheet holding means 13 is constituted by a pair of first rollers 15, a pair of second rollers 16, guide plates 17 and 18, and the like, housed in a recording section case 14 made of a lighttight material.

Figure 2:
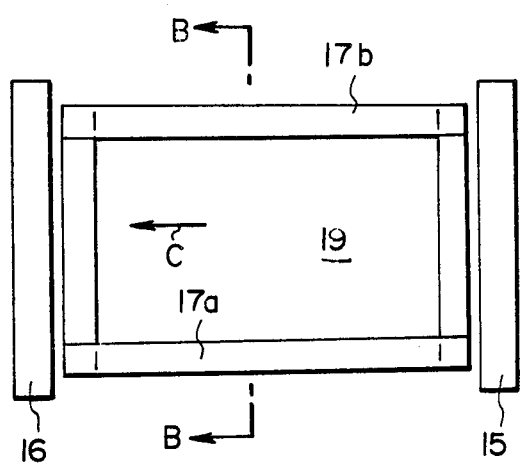
FIG. 2 is a plan view showing the sheet holding means, taken along line A—A of FIG. 1.
Figure 3:
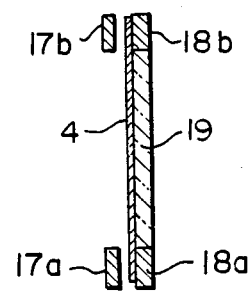
FIG. 3 is a sectional view showing the sheet holding means, taken along line B—B of FIG. 2.

The configuration of the sheet holding means 13 will hereinbelow be described with reference to FIG. 1, FIG. 2, which is a plan view taken along line A—A of FIG. 1, and FIG. 3, which is a sectional view taken along line B—B of FIG. 2. The recording section case 14 is provided with a sheet conveyance port 50 in the wall adjacent the image read-out section 31 and the erasing section 32. The first rollers 15 are positioned near the sheet conveyance port 50 for conveying the stimulable phosphor sheet 4, which is fed through the sheet conveyance port 50, in the direction as indicated by the arrow C. On the side downstream of the first rollers 15 in the sheet conveyance direction, guide plates 17a and 18a are positioned to be vertically spaced by a predetermined distance, and guide plates 17b and 18b are positioned in the same manner. The guide plates 17a and 18a and the guide plates 17b and 18b extend in the sheet conveyance direction to sandwich the side edge portions of the sheet 4 between the guide plates 17a and 18a and between the guide plates 17b and 18b. The second rollers 16 are positioned on the side downstream of the guide plates 17a, 18a, 17b and 18b in the sheet conveyance direction. A radiation-permeable supporting plate 19 made of a radiation permeable material such as an acrylic resin and flush with the surfaces of the guide plates 18a and 18b is positioned between the guide plates 18a and 18b which guide the lower surface of the sheet 4 at its side edge portions. Therefore, the sheet 4 conveyed through the sheet conveyance port 50 is sandwiched and guided at its side edge portions by the guide plates 17a and 18a and the guide plates 17b and 18b, and the lower surface of the sheet 4 is guided along the radiation-permeable supporting plate 19. When the sheet 4 is completely conveyed to the image recording position, the rear end and the front end of the sheet 4 in the sheet conveyance direction are respectively held between the first rollers 15 and between the second rollers 16, and the sheet 4 is held thereby at the image recording position. The sheet conveyance port 50 is provided with a shutter 51 for closing the sheet conveyance port 50 at all times other than when the sheet 4 is being conveyed into and out of the image recording position so that the radiation does not enter the image read-out section 31 and the erasing section 32.

The fluoroscopic means 20 positioned under the sheet holding means 13 is constituted, for example, by a combination of an image intensifier facing the radiation source 11 and a television camera. When the stimulable phosphor sheet 4 is not held by the sheet holding means 13, the radiation emitted by the radiation source 11 and passing through the object 1 is received by the image intensifier, and the image thus obtained in received by the television camera. In this manner, the radiation image of the object 1 is converted into an electric signal for producing a visible image. The electric signal is transmitted to an imaging device 3 constituted by a CRT or the like via a line 2, and visible radiation image is reproduced on the image device 3.

At the image read-out section 31, the stimulable phosphor sheet 2 carrying the radiation image stored therein is exposed to stimulating rays emitted by a stimulating ray source 31a and made to impinge upon the sheet 4 by a galvanometer mirror 31b. Light emitted by the sheet when it is exposed to stimulating rays is guided by a light guide member 31c and photoelectrically detected by a photomultiplier 31d. At the image read-out section 31, a read-out means as disclosed, for example, in U.S. Pat. Nos. 4,368,384, 4,369,367 and 4,410,799 may be used. At the erasing section 32, radiation energy remaining on the sheet 4 after the image read-out and noise caused by radioactive isotopes contained in the stimulable phosphor are erased, for example, by erasing light emitted by erasing lamps 32a to make the sheet 4 reusable for image recording. At the erasing section 32, an erasing means as disclosed, for example, in U.S. Pat. No. 4,400,619 may be used. The image read-out section 31, the erasing section 32 and the circulation and conveyance means 40 are housed in a read-out and erasing section case 30 made of a lighttight material.

As shown in FIG. 1, the circulation and conveyance means 40 comprises a plurality of conveyance systems constituted by rollers and belts. Specifically, the means 40 comprises a first conveyance system 41 for conveying the stimulable phosphor sheet 4 out of the erasing section 32 after erasing, a third conveyance system 43 having one end facing the sheet conveyance port 50 for conveying the erased sheet 4 to the sheet holding means 13 via the sheet conveyance port 50 and conveying the sheet 4 carrying a radiation image stored therein at the sheet holding means 13 out of the sheet holding means 13 via the sheet conveyance port 50, a fourth conveyance system 44 for conveying the sheet 4 carrying the radiation image stored therein to the image read-out section 31, a second conveyance system 42 having one end facing the third conveyance system 43 and the other end facing the first conveyance system 41 and the fourth conveyance system 44 for conveying the erased sheet 4 from the first conveyance system 41 to the third conveyance system 43 by the aid of a guide plate 46 and conveying the sheet 4 carrying a radiation image stored therein from the third conveyance system 43 to the fourth conveyance system 44, and a fifth conveyance system 45 having a switch-back mechanism for conveying the sheet 4 subjected to the image read-out at the image read-out section 31 to the erasing section 32.

Operations of the radiation image recording and read-out apparatus constructed a described above will be described below.

First, the object 1 is placed on the object supporting base 12 and is exposed to the radiation 11a emitted by the radiation source 11 without stimulable phosphor sheet 4 being held at the sheet holding means 13. The radiation 11a passing through the object 1 passes through the sheet holding means 13 and impinges upon the fluoroscopic means 20 which converts the radiation image of the object 1 into an electric signal for producing a visible image. The electric signal is transmitted to the imaging device 3 via the line 2 and used to reproduce a visible radiation image of the object 1 on the imaging device 3. The operator conducts image recording with the required timing by observing the monitor image reproduced on the imaging device 3. When image recording is finished, emission of the radiation 11a by the radiation source 11 is stopped, the shutter 51 is opened, and the stimulable phosphor sheet 4 is fed from the sheet conveyance port 50 to the sheet holding means 13 by the third conveyance system 43 and the first rollers 15 (conveyance in the directions as indicated by the arrows D3 and C). Before this step, the sheet 4 erased at the erasing section 32 is conveyed to the third conveyance system 43 by the first conveyance system 41 and the second conveyance system 42 (conveyance in the directions as indicated by the arrows, D1, D2 and D3).

When the sheet 4 is conveyed into the sheet holding means 13, it is guided by the guide plates 17 and 18 and the radiation-permeable supporting plate 19, and is fixed at the image recording position with the rear and front sheet ends grasped between the first rollers 15 and between the second rollers 16. Then, the radiation 11a is emitted by the radiation source 11, and the radiation image of the object 1 is recorded on the sheet 4. The sheet 4 is then conveyed reversely to the direction indicated by the arrow C to the third conveyance system 43 via the sheet conveyance port 50, and is conveyed to the image read-out section 31 via the fourth conveyance system 44 (conveyance in the directions as indicated by the arrows E1, E2 and E3). After the image readout is conducted on the sheet 4 at the image read-out section 31, the sheet 4 is conveyed by the fifth conveyance system 45 to the erasing section 32 (conveyance in the directions as indicated by the arrows F1, F2 and F3), and radiation energy remaining on the sheet 4 is erased.

The fifth conveyance system 45 has the switch-back conveyance mechanism as described above. After the image read-out is conducted on the sheet 4 at the image read-out section 31, the sheet 4 is conveyed along a conveyor belt 45a and a guide plate 45b, and then conveyed in the direction as indicated by the arrow F1 by being grasped between conveyor belts 45c and 45d. When a position sensor or the like detects that the sheet 4 has been conveyed until the rear end of the sheet 4 is grasped between conveyor belts 45c and 45d, the conveyor belts 45c and 45d are rotated reversely to switch back the sheet 4 in the direction as indicated by the arrow F2. The sheet 4 conveyed by the conveyor belts 45c and 45d in the direction as indicated by the arrow F2 is then grasped between conveyor belts 45e and 45f facing the left ends of the conveyor belts 45c and 45d, and conveyed by the conveyor belts 45e and 45f to the erasing section 32. At this time, the sheet 4 is moved reversely by the switch-back conveyance, and conveyed into the erasing section 32 with the stimulable phosphor surface facing up so that the stimulable phosphor surface of the sheet 4 is exposed to erasing light emitted by the erasing lamps 32a.

By repeating the aforesaid operations, it is possible to circulate and reuse the stimulable phosphor sheet 4.

The whole radiation image recording and read-out apparatus may be made inclinable within a predetermined range, and the image read-out section 31 and the erasing section 32 need not necessarily be positioned below the object supporting base 12. Also, the image recording section 10 may be provided with subdivision radiography function. Further, a means such as a bucky device or a stationary grid for eliminating scattered radiation may be positioned between the object supporting base 12 and the image recording position.

We claim:

1. A radiation image recording and read-out apparatus comprising:
   (i) a circulation and conveyance means (40) for conveying at least one stimulable phosphor sheet (4) for recording a radiation image thereon along a predetermined circulation path;
   (ii) an image recording section (10) provided with a sheet holding means (13) positioned outside said circulation path for recording a radiation image of an object (1) on said stimulable phosphor sheet by exposing said stimulable phosphor sheet to radiation passing through said object, said circulation and conveyance means including reversible sheet feeding means for conveying the phosphor sheet in opposite directions between said circulation path and said image recording section, and a fluoroscopic means (20) for receiving said radiation passing through said sheet holding means when said stimulable phosphor sheet is not held by said sheet holding means and for converting said radiation into a signal for producing a visible image,
   (iii) an image read-out section (31) positioned on said circulation path and provided with stimulating ray source (13a) for emitting stimulating rays for scanning a stimulable phosphor sheet carrying a radiation image stored thereon at said image recording section, and a photoelectric read-out means for detecting light emitted by said stimulable phosphor sheet scanned with said stimulating rays to obtain an electric image signal;
   (iv) an erasing section (32) positioned on said circulation path for releasing the radiation energy remaining on said stimulable phosphor sheet, prior to the next image recording on said stimulable phosphor sheet; and switch-back conveying means located between said image read-out section and said erasing section.

2. An apparatus as defined in claim 1 wherein said sheet holding means is housed in a case (14) made of a lighttight material and provided with a sheet conveyance port (50) having an openable shutter (51).

3. An apparatus as defined in claim 1 or 2 wherein said sheet holding means comprises two pairs of rollers (15.16) for grasping the front end and the rear end of said stimulable phosphor sheet, two pairs of guide plates (17.18) extending between said two pairs of rollers for guiding the side edges of said stimulable phosphor sheet, and a radiation-permeable supporting plate (19) extending between said two pairs of rollers for supporting the lower surface of said stimulable phosphor sheet.

4. An apparatus as defined in claim 1 or 2 wherein said fluoroscopic means is positioned under said sheet holding means.

5. An apparatus as defined in claim 1 wherein said circulation and conveyance means comprises conveyor belts and rollers.

* * * * *